United States Patent [19]

Saito

[11] Patent Number: 5,060,977

[45] Date of Patent: Oct. 29, 1991

[54] MAGNET-INCLUSIVE COMPONENT SUITABLE FOR USE IN OCCUPANT-PROTECTING MEANS FOR MOTOR VEHICLE AND FABRICATION PROCESS THEREOF

[75] Inventor: Hiroyuki Saito, Kanagawa, Japan

[73] Assignee: Nippon Seiko Kabushiki Kaisha, Tokyo, Japan

[21] Appl. No.: 486,863

[22] Filed: Mar. 1, 1990

[30] Foreign Application Priority Data

Mar. 1, 1989 [JP] Japan .................................. 1-49446

[51] Int. Cl.$^5$ ............................................. B60R 22/04
[52] U.S. Cl. .................................... 280/802; 280/804; 24/303; 242/57; 73/519; 29/400.1
[58] Field of Search ................. 280/802, 803, 804, 801

[56] References Cited

U.S. PATENT DOCUMENTS

| | | | |
|---|---|---|---|
| 4,070,040 | 1/1978 | Igeta | 280/804 |
| 4,763,750 | 8/1988 | Yoshitsugu | 280/804 |
| 4,943,087 | 7/1990 | Sasaki | 280/804 |
| 4,946,196 | 8/1990 | Doty | 280/803 |

FOREIGN PATENT DOCUMENTS 63-35868 9/1988 Japan .
63-40045 10/1988 Japan .

*Primary Examiner*—Kenneth R. Rice
*Attorney, Agent, or Firm*—Wegner, Cantor, Mueller & Player

[57] ABSTRACT

A magnet-inclusive component is furnished for use in an occupant protecting system, such as a seat belt system, for a motor vehicle. The component includes a magnet and at least one member located adjacent the magnet. The magnet is molded or cast in situ in the adjcent member, preferably by integrally incorporating a magnetizable member in the adjacent member upon formation of the latter by molding or casting and then subjecting the magnetizable member to magnetization.

8 Claims, 10 Drawing Sheets

FIG.11 (a) (PRIOR ART)
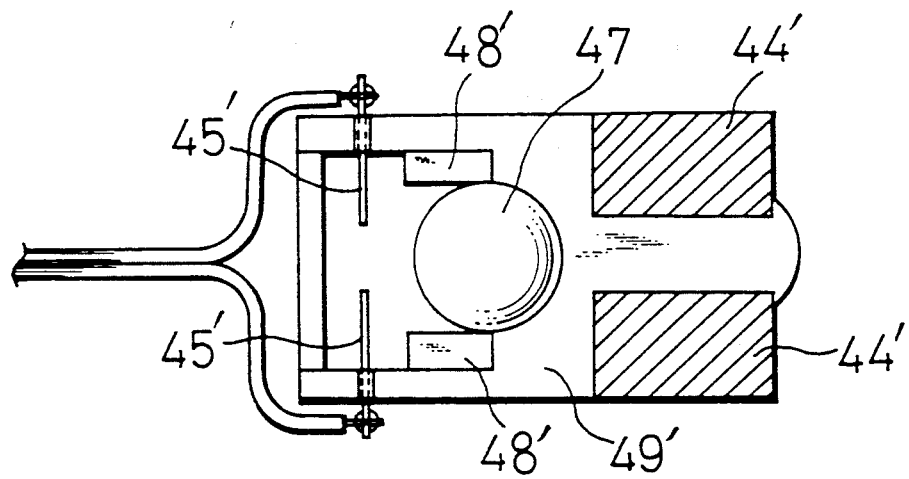
FIG.11 (b) (PRIOR ART)
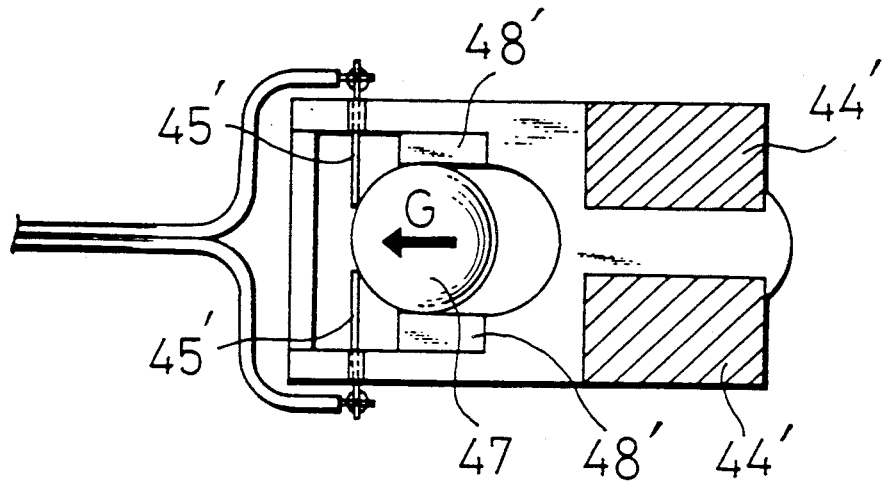

MAGNET-INCLUSIVE COMPONENT SUITABLE FOR USE IN OCCUPANT-PROTECTING MEANS FOR MOTOR VEHICLE AND FABRICATION PROCESS THEREOF

BACKGROUND OF THE INVENTION

1) Field of the Invention

The present invention relates to an occupant-protecting means, such as a seat belt system, for a motor vehicle, especially to a magnet-inclusive component useful in a buckle, a retractor, an acceleration sensor or the like of a seat belt system.

2) Description of the Related Art

A motor vehicle is provided with various safety devices or systems for protecting an occupant in safe in the event of a vehicular emergency such as a collision, led by a seat belt system which restrains and protects the occupant by a webbing. These devices or systems include those using a magnet-inclusive component which makes use of the action of magnetic force.

Illustrative of such devices or systems include an emergency release buckle (ERB) of a passive seat belt system and a buckle of a manual seat belt system, each of said buckles being capable of confirming by a magnetic sensor whether a tongue connected to a webbing is latched or not; a wound webbing length sensor for a retractor, said sensor being capable of detecting the length of a webbing wound on the retractor; and an acceleration sensor (G-sensor) for sensing an acceleration applied in the event of an emergency such as a collision.

These magnet-inclusive components have heretofore been fabricated by assembling magnets with adjacent parts or members in accordance with adhesion or crimping or by fitting magnets between holding surfaces of adjacent parts or members. A magnet however has strong magnetic force. The magnet is therefore attracted toward another magnetic member, whereby it is difficult to handle the magnet upon assembly.

With the foregoing in view and further, taking into additional consideration the tendency that an adjacent portion may be modified and deformed on standing, it is difficult to firmly fix a magnet on an adjacent portion. For firm fixing of a magnet, it is indeed necessary to enclose the magnet by adhering a cover over the magnet.

As a result, these conventional magnet-inclusive components are accompanied by the problems that they require many assembly steps in spite of poor dimensional accuracy and substantial rattling and they are impaired in appearance. Moreover, the application of a cover or the like renders the magnet become more distant from a means on which magnetic force is supposed to act from the magnet, such as a magnetic sensor, resulting in the problem that the performance itself of the magnet is impaired.

SUMMARY OF THE INVENTION

An object of the present invention is therefore to firmly fix a magnet, to simplify the assembly process, to improve the dimensional accuracy for reduced rattling, and further to improve the appearance.

As a result of an extensive investigation, the present inventor has found that the above object of the present invention can be achieved by in situ molding or casting of a magnet in an adjacent part or member.

In one aspect of the present invention, there is thus provided a magnet-inclusive component suitable for use in an occupant protecting means for a motor vehicle. The component has a magnet and at least one member located adjacent the magnet. The magnet is molded or cast in situ in the adjacent member.

In another aspect of the present invention, there is also provided a process for the fabrication of a magnet-inclusive component suitable for use in an occupant protecting means for a motor vehicle, said component having a magnet and at least one member located adjacent the magnet. The process comprises incorporating a magnetizable member integrally in the adjacent member upon formation of the latter by molding or casting and then subjecting the magnetizable member to magnetization.

In the present invention, the magnetizable member is incorporated in the adjacent member upon formation of the latter by molding or casting the same with a material (e.g., a plastic material, aluminum, zinc, rubber or the like) having a melting point lower than the melting point of the magnetizable member. The magnetizable member is firmly held in place at surfaces, which are in contact with the adjacent member thus molded or cast, owing to shrinkage of the material which takes place subsequent to the molding or casting.

Compared with the subsequent adhesion of a magnet on a main body of an adjacent element as has been practiced to date, the magnet can be fixed more firmly. An anti-separation means for the magnet can be easily provided when the magnetizable member is provided with a projection or one or more bores or grooves are formed in the magnetizable member and a molding or casting material is poured into the bores or grooves.

As a result, rattling is eliminated, thereby making it possible to fix the magnet more firmly. It is hence no longer needed to adhere a magnet or to apply a cover over a magnet, whereby the assembly process has been simplified. In addition, the magnet-inclusive component can be finished neat to have better appearance.

By the present invention, the magnet can be more firmly fixed on the main body of the adjacent member compared with the subsequent adhesion of the magnet on the main body of the adjacent member. In the case of adhesion, there is the potential problem that a gap may be formed between a magnet and a main body of an adjacent member. In the case of molding or casting, no gap is formed and the positional and dimensional accuracy is improved. Therefore, the magnet is free from rattling so that the magnet-inclusive component obviously produces no rattling noise. Since the fixing, i.e., in situ molding or casting of the magnet in the adjacent member is performed in a single procedure, the number of steps upon assembly of the magnet and the adjacent member becomes smaller. The designing of an anti-separation means can be simplified because it can be formed by providing a magnet with a projection or by forming one or more bores or grooves in a magnet and pouring a molding or casting material into the bores or grooves.

In short, the following advantages can be brought about by the present invention:

(1) The unification of a magnet with an adjacent member such as a magnet holder is achieved by molding or casting. The positional accuracy of the magnet can therefore be improved.

(2) A magnet does not become loose so that the problem of rattling noise can be avoided.

(3) The number of assembly steps can be reduced.

(4) The post-molding or casting magnetization can obviate the cumbersome handling of a magnet during its assembly into a magnet-inclusive component.

(5) A cover is no longer needed. It is hence possible to arrange a magnet as close as possible to a means on which the magnetic field of the magnet is supposed to act, such as a magnetic sensor.

(6) A finished magnet-inclusive component is neat and has better appearance.

BRIEF DESCRIPTION OF THE DRAWINGS

The above and other objects, features and advantages of the present invention will become apparent from the following description and the appended claims, taken in conjunction with the accompanying drawings, in which:

FIGS. 1(a) through 1(c) illustrate a magnet-inclusive component according to a first embodiment of the present invention as incorporated in an emergency release buckle for a passive seat belt system, in which FIG. 1(a) shows a tongue unlatched from the buckle, FIG. 1(b) illustrates the tongue latched in the buckle, and FIG. 1(c) depicts the magnet-inclusive component;

FIGS. 2(a) through 2(c) show a magnet-inclusive component according to a second embodiment of the present invention as incorporated in a buckle for a manual seat belt system, in which FIG. 2(a) illustrates a tongue unlatched from the buckle, FIG. 2(b) illustrates the tongue latched in the buckle, and FIG. 2(c) depicts the magnet-inclusive component in detail;

FIGS. 3(a) through 3(d) depict a magnet-inclusive component according to a third embodiment of the present invention as incorporated in a wound webbing length sensor of a retractor, in which FIG. 3(a) is a front view of the retractor with a webbing wound therein over a great length, FIG. 3(b) is a side view of the reactor, FIG. 3(c) is a side view of the retractor with the webbing wound therein over a small length, and FIG. 3(d) shows a magnet-inclusive component in detail;

FIGS. 6(a) through 6(c) illustrate a magnet-inclusive component according to a sixth embodiment of the present invention as employed as a tongue holder, in which FIG. 6(a) shows a tongue in use, FIG. 6(b) depicts the tongue not in use, and FIG. 6(c) shows the magnet-inclusive component in detail;

FIGS. 11(a) and 11(b) show a conventional exemplary acceleration sensor, in which the acceleration sensor is in a normal state in FIG. 11(a) but in an actuated state in FIG. 11(b).

DETAILED DESCRIPTION OF THE INVENTION AND PREFERRED EMBODIMENTS

Figure 1:
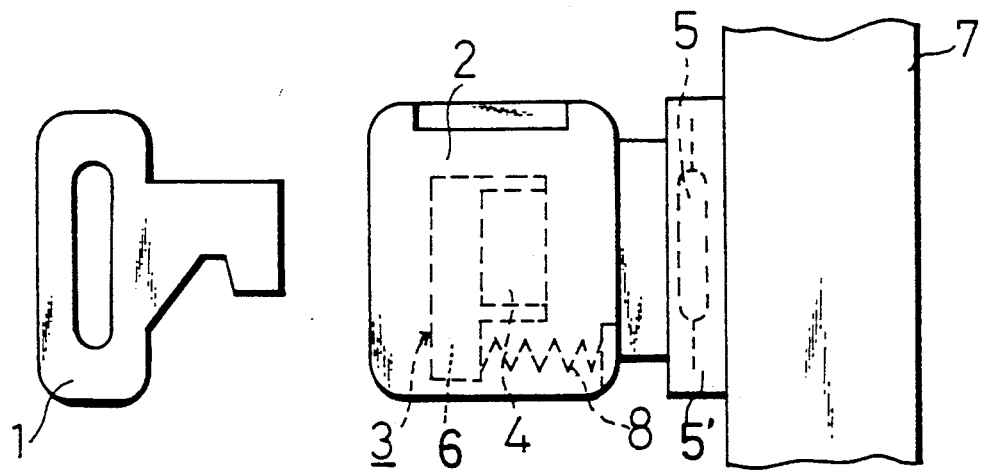
Figure 1:
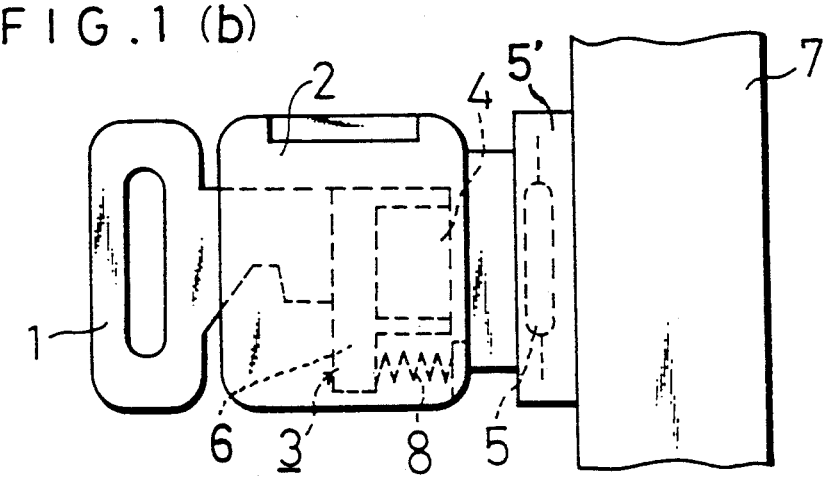
Figure 1:
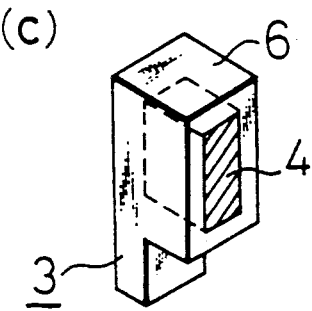

While being to be compared with some conventional examples, a description will hereinafter be made of certain embodiments of the magnet-inclusive component of the present invention which is of the type that a magnet is molded or cast in situ in an adjacent member by integrally incorporating a magnetizable member in the adjacent member upon formation of the latter by molding or casting and then subjecting the magnetizable member to magnetization.

Referring first to FIGS. 1(a) through 1(c), the first embodiment of the present invention will be described.

In FIG. 1(a), a tongue 1 is unlatched from an emergency release buckle 2 secured to a slider 5' which travels along a guide rail 7 mounted on a vehicle body. Attached to the emergency release buckle 2 are a magnet-inclusive component 3, which is constructed as an integral unit of a magnet holder 6 and a magnet 4, and a compression spring 8. The slider 5' is provided with a magnetic sensor 5 constructed of a reed switch, a Hall-effect generator, a magnetoresistor or the like. In the state shown in FIG. 1(a), the magnet 4 is located remote from the magnetic sensor 5 under the spring force of the compression spring 8.

FIG. 1(b) shows the tongue 1 and emergency release buckle 2 in a state latched with each other. In this state, the magnet 4 has been pushed close to the magnetic sensor 5 by the tongue 1. When the tongue is brought into a latched state, the magnetic sensor 5 detects the magnetic field of the magnet 4 so that the magnetic sensor 5, for example, stops the generation of an output signal or generates an output signal. It is to be noted that the change of an output signal is not limited only to the alternative, in other words, ON/OFF type only such as that mentioned above but may include any change in output as long as the change permits distinction between the state of FIG. 1(a) and that of FIG. 1(b), such as a change in output voltage level.

Figure 9:
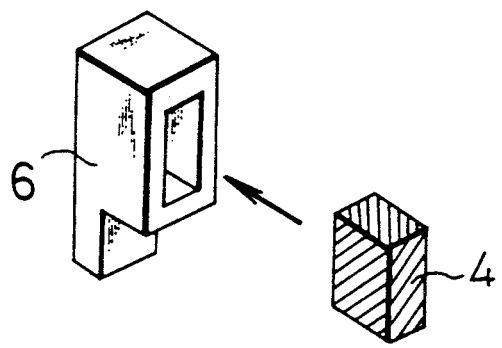
FIGS. 9, 10, 12 and 13 illustrate the methods of assembly of conventional magnet-inclusive components, respectively, in which a magnet is adhered to a holder in FIG. 9, both magnet and cover are adhered to a holder in FIG. 10, a holder having a magnet either fitted therein or adhered thereon is sewed onto a webbing in FIG. 12, and a holder having a magnet adhered thereon is sewed onto a webbing in FIG. 13.
Figure 10:
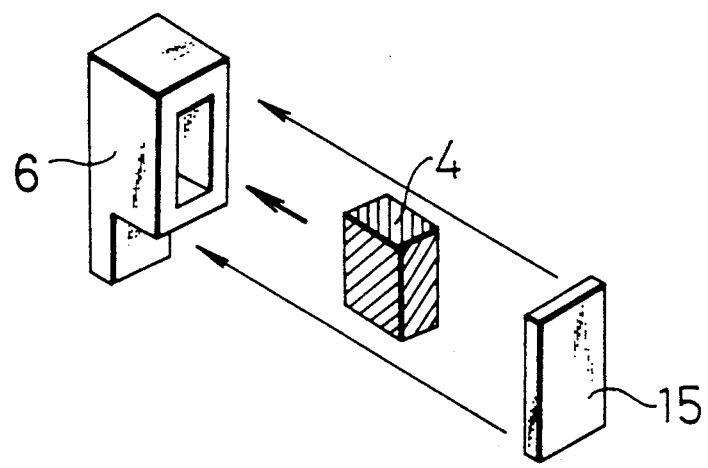

FIG. 1(c) illustrates the magnet-inclusive component 3 in detail. A magnetizable member, which will become the magnet 4 when magnetized, is integrally incorporated, embedded or encapsulated in the magnet holder 3 upon formation of the latter by molding or casting it with a material having a melting point lower than the melting point of the magnetizable member. The magnetizable member is then subjected to magnetization, whereby the magnet-inclusive component 3 is fabricated. It has been the conventional practice that as shown in FIG. 9, a magnet 4 is adhered to a main body of a holder 6 or as depicted in FIG. 10, a magnet 4 is inserted in a main body of a holder 6 and a cover 15 is then applied over the magnet 15. However, the positional accuracy of the magnet can be improved by assembling the magnet as in the present invention. It is unnecessary to fix the magnet with the cover 15, so that the magnet 4 and magnetic sensor 5 can be arranged closer to each other. This allows to improve the sensitivity of the sensor 5.

The sensing performance of the sensor 5 can be improved further by raising one side of the magnet 4, said side being on the side of the magnetic sensor 5, from the surrounding surface of the holder 6.

Figure 2:
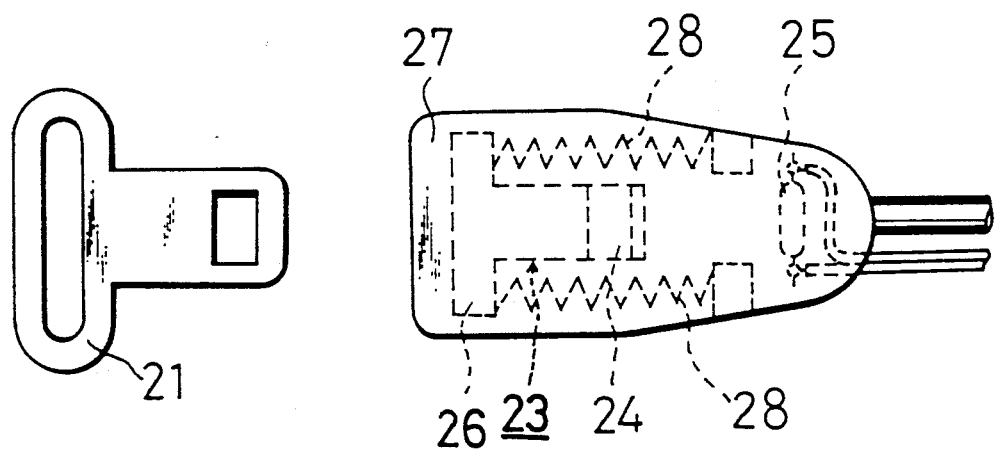
Figure 2:
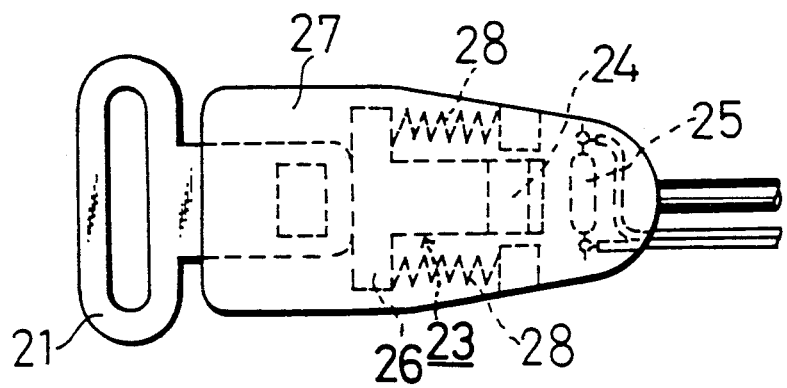
Figure 2:
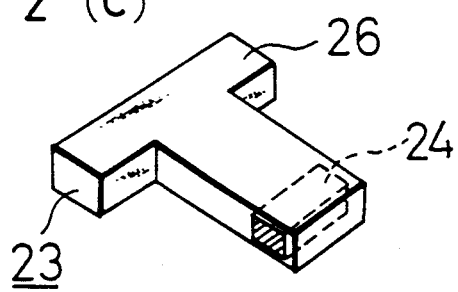

The second embodiment of the present invention is now described with reference to FIGS. 2(a) through 2(c). In FIG. 2(a), a tongue 21 is in a state unlatched from an associated buckle 27 which is connected to a vehicle body or the like. Housed within the buckle 27 are a magnetic sensor 25, a compression spring 28, and a magnet-inclusive component 23 constructed as an integral unit of a magnet holder 26 and a magnet 24. In the state shown in FIG. 2(a), the magnet 24 is pushed leftward, as viewed in the drawing, by the compression spring 28 by way of the holder 26 and is hence located remote from the magnetic sensor 25.

FIG. 2(b) illustrate the tongue 21 and buckle 27 in a latched state. In this state, the magnet 24 has been pushed by the tongue 21 via the holder 26 to a location close to the magnetic sensor 25. When the tongue 21 is brought into the latched state, the magnetic sensor 25 is activated as in FIG. 1(b).

FIG. 2(c) shows the magnet-inclusive component 23 in detail. The relationship between the magnet 24 and the holder 26 is as shown in FIG. 1(c).

Figure 3:
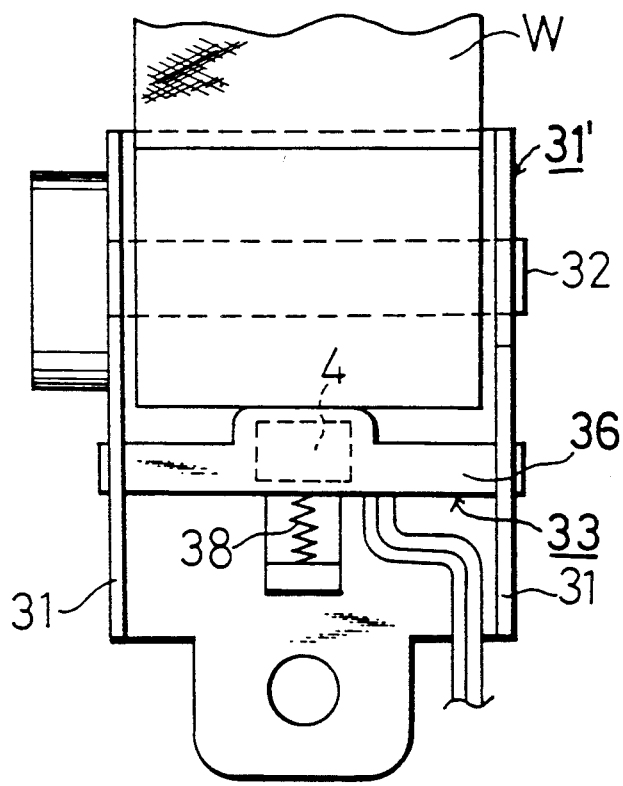
Figure 3:
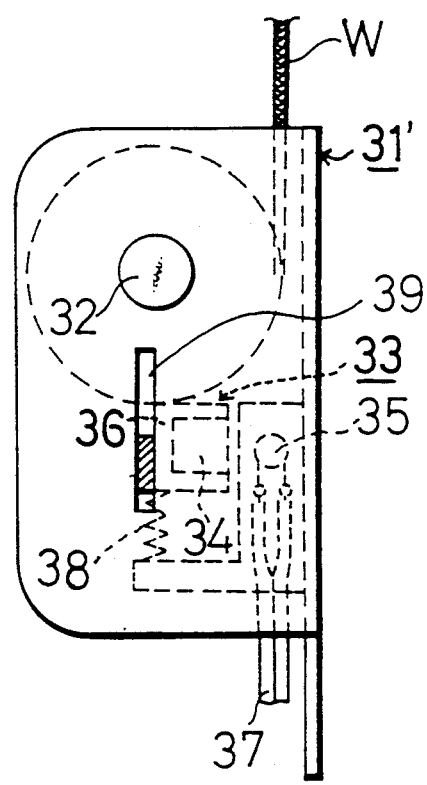
Figure 3:
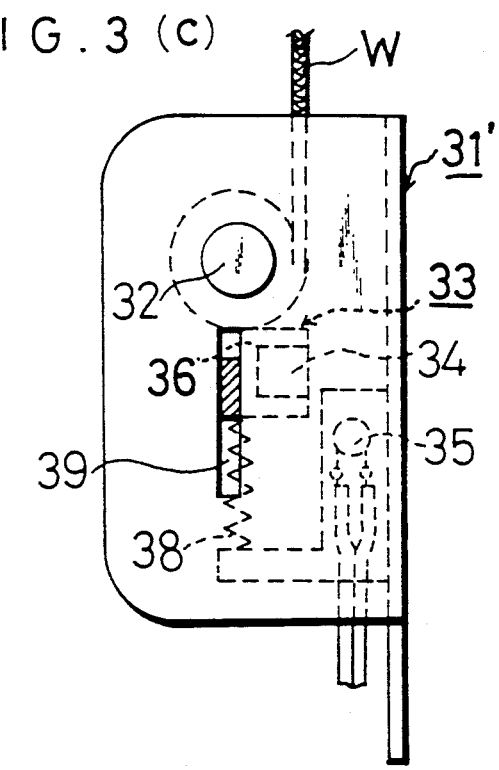
Figure 3:
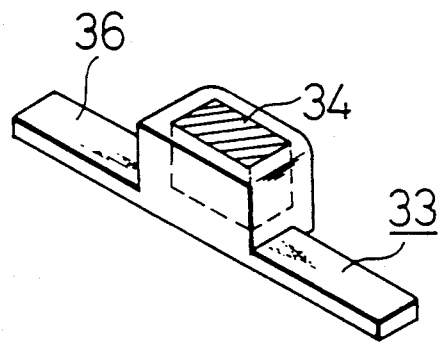

The third embodiment of the present invention is next described with reference to FIGS. 3(a) through 3(d). FIG. 3(a) is a front view of a retractor for taking up a webbing W. The retractor is equipped with a wound webbing length sensor, which comprises a compression spring 38 and a magnet-inclusive component 33 constructed as an integral unit of a magnet holder 36 and a magnet 34. In the drawing, the webbing W has been wound up over a substantial length in the retractor. FIG. 3(b) is a side view of the retractor. FIG. 3(c) is similar to FIG. 3(b) except that the webbing W has been pulled out to a substantial extent. FIG. 3(d) shows the magnet-inclusive component 33 in detail. The structure and fabrication method of the magnet-inclusive component 33 are similar to the embodiments shown in FIGS. 1(c) and 2(c), respectively.

When the webbing W has been pulled out and is wound over a relatively small length on a spindle 32 rotatably supported on a pair of side walls 31, 31 of a retractor base 31', the compression spring 38 attached to a lower side of the magnet holder 36 is in an expanded state and the magnet 34 is located remote from the magnetic sensor 35. When the webbing W is taken up, the magnet holder 36 is pushed outward, namely, downward as viewed in FIGS. 3(a) through 3(c) and the spring 38 is compressed. As a result, the magnetic sensor 35 detects the magnetic field of the magnet 34. When the webbing W is pulled out or taken up, the position of the magnet 34 is moved accordingly. The magnetic sensor 35 detects the movement of the magnet 34, so that the output signal from the magnetic sensor 35 changes. Numeral 37 is a harness for transmitting the signal, while numeral 39 designates guide slots formed in both the side walls 31, 31 to guide the magnet-inclusive component 33. The relationship between the magnet 34 and the magnet holder 36 are similar to the first embodiment shown in FIGS. 1(a) through 1(c).

Figure 4:
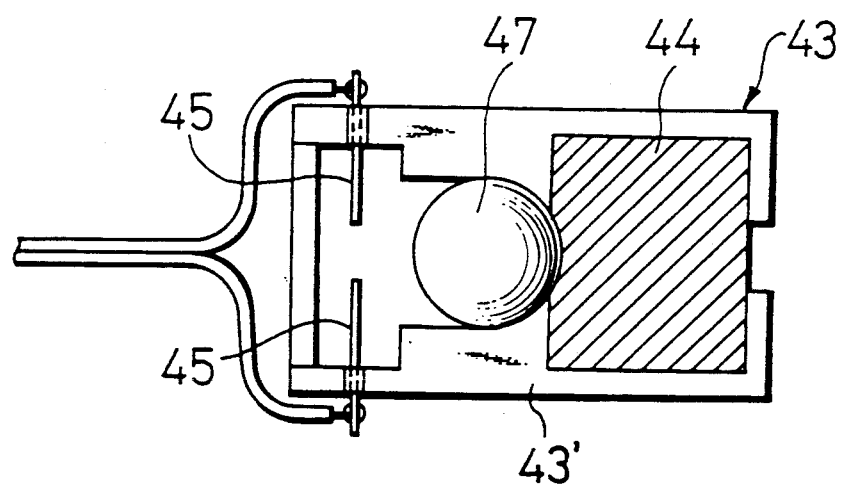
FIG. 4 illustrates a magnet-inclusive component according to a fourth embodiment of the present invention as employed as an acceleration sensor, in which a ball is in a normal state.

FIGS. 11(a) and 11(b) illustrate an exemplary conventional acceleration sensor, while FIG. 4 shows a magnet-inclusive component according to the fourth embodiment of the present invention as employed as an acceleration sensor.

In the conventional example depicted in FIGS. 11(a) and 11(b), a magnet 44' is fixed on a metal-made housing by crimping. In this example, a resin-made bushing 48' is additionally provided to guide a ball 47 which is made of a magnetic, preferably, ferromagnetic material. In a normal state depicted in FIG. 11(a), the ball 47 is attracted toward the magnet 44'. When an acceleration is applied, for example, in the event of a collision as shown in FIG. 11(b), the ball 47 is caused to move against the magnetic force of the magnet 44' and is brought into contact with paired contacts 45' to actuate the acceleration sensor.

Turning now to the acceleration sensor shown as the fourth embodiment of the present invention in FIG. 4, a magnetizable member is embedded as an integral member in a housing 43', which corresponds to the bushing 48' and housing 49' of the above conventional example, upon formation of the housing 43' by molding or casting it, for example, with a plastic material. The magnetizable member is then subjected to magnetization, whereby the magnet 44 is formed. An electrically-conductive ball 47 made of a magnetic, preferably, ferromagnetic material and a pair of contacts 45, 45 are then provided to furnish a magnet-inclusive component 43 as the acceleration sensor. When an acceleration is applied, the ball 47 is caused to move away from the magnet 44 and the contacts 45, 45 are short-circuited.

Figure 5:
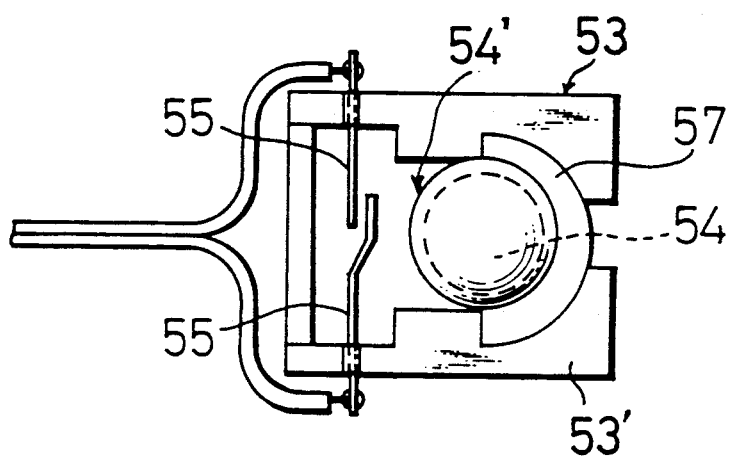
FIG. 5 shows a magnet-inclusive component according to a fifth embodiment of the present invention as employed in an acceleration sensor, in which a spherical magnet is in a normal state.

FIG. 5 illustrates a magnet-inclusive component according to the fifth embodiment of the present invention, which is suitable for use in an acceleration sensor. A magnet 54 is formed in a spherical shape. Designated at numeral 57 is a magnetic member, for example, an iron plate. The iron plate 57 is integral with a housing 53'. The magnet 54 is molded in situ in a surface resin layer 54'. The spherical magnet 54 is movably received in the housing 53' and contacts 55, 55 are provided, whereby an acceleration sensor 53 has been assembled. In a normal state shown in the drawing, the spherical magnet 54 is attracted by its own magnetic force on the iron plate 57. As soon as an acceleration is detected, the spherical magnet 54 is caused to move away against the attraction force between the spherical magnet 54 and the iron plate 57, whereby the contacts 55, 55 are closed. The layer 54' is effective in reducing the noise of the magnet 54 and also improving the smooth movement of the magnet 54.

Figure 6:
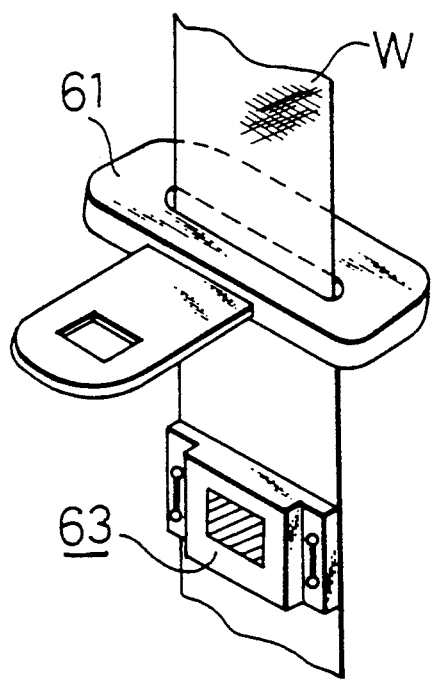
Figure 6:
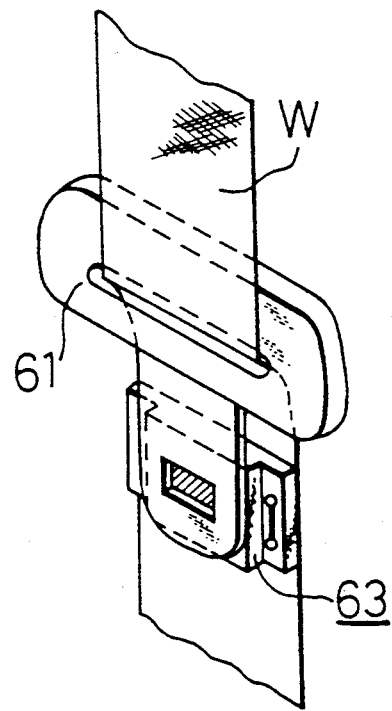
Figure 6:
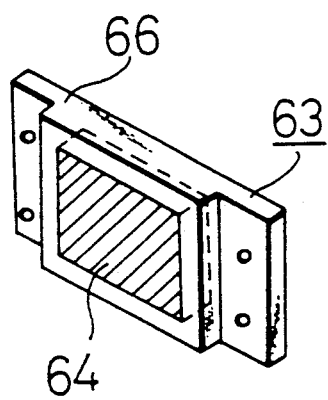

FIGS. 6(a) through 6(c) illustrate a magnet-inclusive component 63 according to a sixth embodiment of the present invention as employed as a tongue holder for holding a tongue 61, which is connected to an associated webbing W, while the tongue 61 is not in use.

FIG. 6(a) shows the tongue 61 in use, while FIG. 6(b) depicts the tongue 61 not in use.

Figure 12:
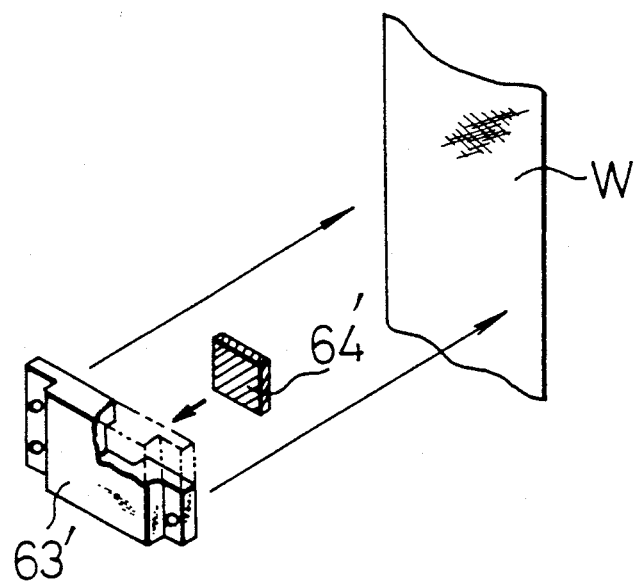
Figure 13:
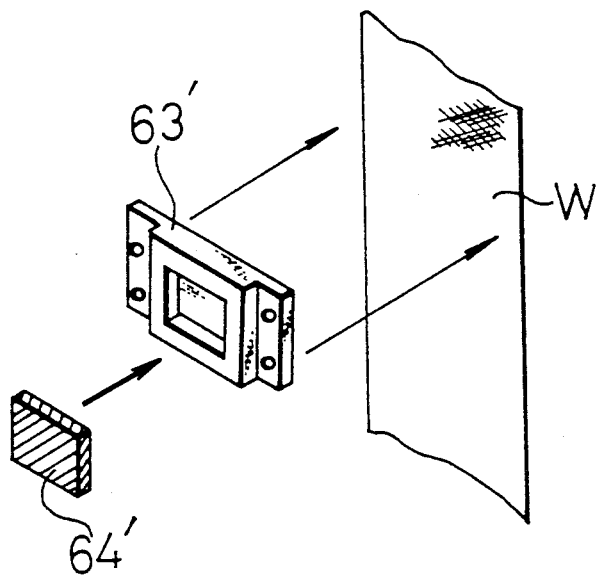

When the magnet-inclusive component 63 is attached to a suitable position on the webbing W, the tongue 61 can be attracted on and held by a magnet 64 while the tongue 61 is not used. As shown in FIG. 12 or 13, a tongue holder has heretofore been formed by fitting or adhering a magnet 64' in or to a base 63' and then sewing the base 63' on an associated webbing W. In the sixth embodiment of the present invention, a magnet 64 is embedded as an integral member in a magnet holder 66 by integrally incorporating a corresponding magnetizable member in the magnet holder upon formation of the latter by molding or casting. The magnetizable member is then subjected to magnetization, whereby the magnet-inclusive component 63 is formed. The magnet-inclusive component 63 is then sewed as a tongue holder onto a webbing W.

FIGS. 7(a) through 7(j) show a variety of modifications of the magnet-inclusive component 3 shown in FIG. 1.

Figure 7:
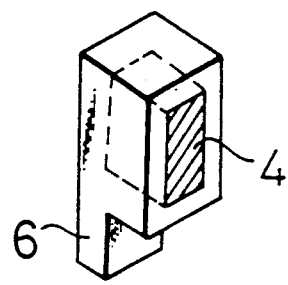
FIGS. 7(a) through 7(i) and FIGS. 8(a) through 8(d) show a variety of modifications of the magnet-inclusive component according to the present invention.
Figure 7:
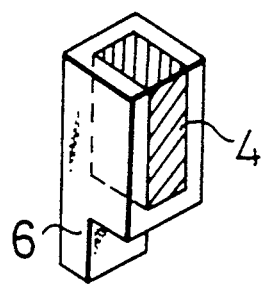
Figure 7:
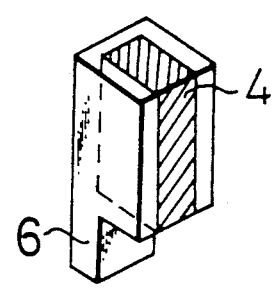
Figure 7:
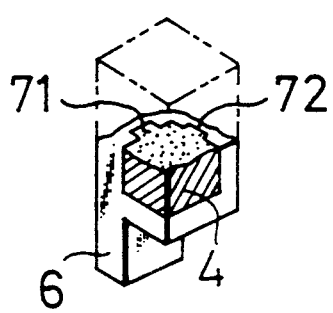
Figure 7:
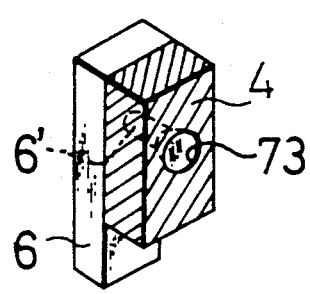
Figure 7:
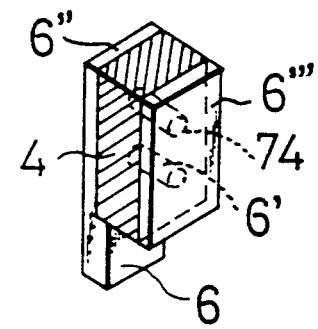
Figure 7:
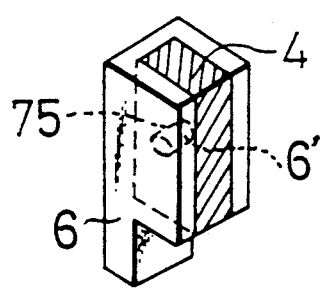
Figure 7:
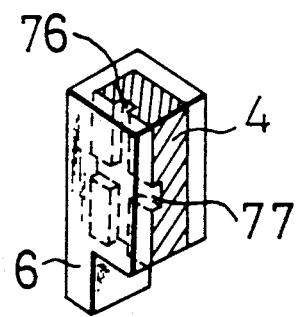
Figure 7:
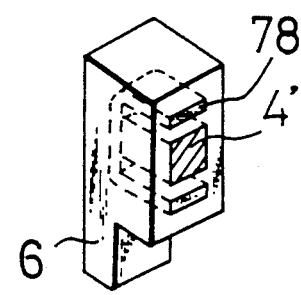

A magnet 4 is held at five or four sides by a magnet holder 6 owing molding or casting shrinkage in FIG. 7(a).

Similarly, a magnet 4 is held at four or three sides by a magnet holder 6 in FIG. 7(b).

A magnet 4 is likewise held at three or two sides by a magnet holder 6 in FIG. 7(c).

In FIG. 7(d), a magnet 4 is provided with projections 71, 71 which are in engagement with recesses 72, 72 formed in a magnet holder 6. The projections 71, 71 and recesses 72, 72 serve an anti-separation means for the magnet 4. The magnet-inclusive component can be fabricated, for example, by providing a magnetizable member having projections, molding or casting the magnet holder with the magnetizable member incorporated therein, and then subjecting the magnetizable member to magnetization.

Referring next to FIG. 7(e), an anti-separation means is formed of a bore 73 in a magnet 4 and a pin 6' fixedly received in the bore 73. The pin 6' is an integral part of a magnet holder 6. For example, the anti-separation means can be formed in the following manner. A magnetizable member which defines a bore is provided first. A molding or casting material is allowed to flow into the bore upon formation of the magnet holder as an integral member with the magnetizable member by molding or casting. After curing or hardening of the molding or casting material, the magnetizable member is subjected to magnetization to convert it into the magnet 4.

In FIG. 7(f), a magnet 4 is held at opposite vertical sides thereof between holder portions 6", 6''' which are united together by way of pins 6', 6' formed integrally with the holder portions 6", 6''' and extending bores 74, 74 of the magnet 4. The pins 6', 6' can be formed as described above in connection with FIG. 7(e).

Reference is now had to FIG. 7(g), in which a magnet 4 is held at three sides by a magnet holder 6. An anti-separation means for the magnet 4 is formed by a bore 75 formed in the magnet 4 and a pin 6' extending through the bore 75. The anti-separation means can be formed as described above in connection with FIG. 7(e).

In FIG. 7(h), an anti-separation means for a magnet 4 is constructed by cruciform grooves 76, 77, which are formed in one side of the magnet 4, and ridges extending from a magnet holder 6 and received in the grooves 76, 77. The anti-separation means can be formed as described above in connection with FIG. 7(e).

In FIG. 7(i), a magnetic circuit is formed by integrating a magnetic member 78 such as an iron plate with a magnet 4'.

Needless to say, these modifications can be applied not only to the embodiment of FIGS. 1(a) through 1(c) but also to the embodiment of FIG. 2(a) through FIG. 6(c).

FIG. 8(a) through 8(d) show still further modifications of the magnet-inclusive component according to the present invention.

Figure 8:
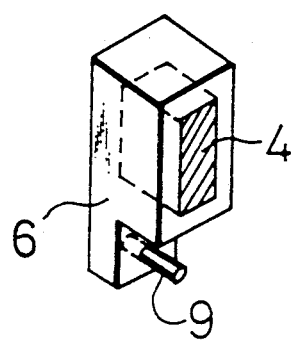
Figure 8:
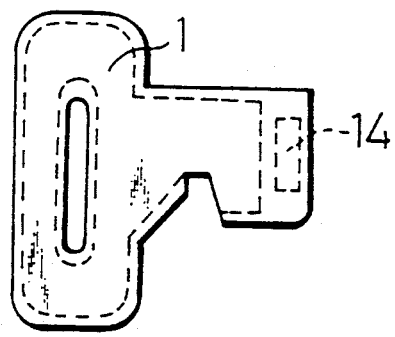
Figure 8:
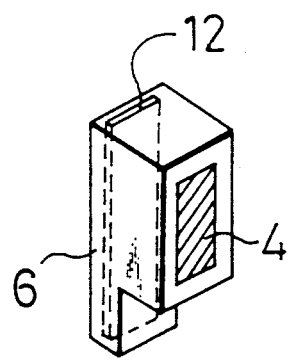
Figure 8:
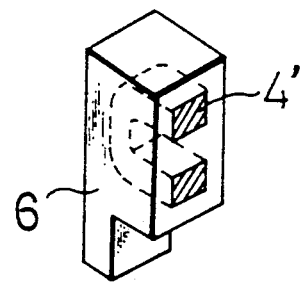

In FIG. 8(a), a pin 9 made of iron or the like has also been embedded as an integral member in a magnet holder 6 upon formation of the latter 6 by molding or casting. The pin 9 serves as a guide for an associated compression spring 8 [see FIGS. 1(a) and 1(b)].

Referring next to FIG. 8(b), a tongue 1 and a magnet 14 have been simultaneously embedded as an integral member in a magnet holder 6 upon formation of the latter by by molding or casting.

Reference is now had to FIG. 8(c), a rigid member 12 such as an iron plate is also embedded as an integral member in a magnet holder 6 upon formation of the latter by molding or casting. The resultant magnet-inclusive component is reinforced by the rigid member 12.

In FIG. 8(d), a U-shaped magnet 4' is embedded as an integral member in a magnet holder 6, thereby forming a magnet-inclusive component.

These modifications can also be applied to the embodiments of FIG. 2(a) through FIG. 6(c) as needed.

I claim:

1. In a magnet-inclusive component suitable for use in an occupant protecting means for a motor vehicle, said component having a magnet and at least one member located adjacent the magnet, the improvement wherein the adjacent member has a melting point lower than the magnet and the magnet is molded or cast in situ in the adjacent member.

2. The component of claim 1, further comprising an anti-separation means for the magnet, said anti-separation means being provided between the magnet and the adjacent member.

3. The component of claim 2, wherein the anti-separation means comprises at least one bore formed in the magnet and a matching projection formed of the same material as the adjacent member and extending as an integral part from the adjacent member.

4. The component of claim 2, wherein the anti-separation means comprises at least one groove formed in the magnet and a matching ridge formed of the same material as the adjacent member and extending as an integral part from the adjacent member.

5. The component of claim 2, wherein the anti-separation means comprises at least one projection formed on the magnet and a matching recess formed in the adjacent member.

6. The component of claim 1, wherein a surface of the magnet is exposed to the outside, flush relative to a surrounding surface of the adjacent member.

7. The component of claim 1, wherein a surface of the magnet is exposed to the outside and is raised from a surrounding surface of the adjacent member.

8. In a magnet-inclusive component suitable for use in a passive seat belt assembly, said assembly having a guide rail, a slider operatively movable along the guide rail, an emergency release buckle secured on the slider, a tongue releasably latched in the buckle, a magnet holder movably provided in the buckle, a magnet provided integrally with the magnet holder and movable between a first position which the magnet assumes while the tongue is not inserted in the buckle and a second position which the magnet takes while the tongue is inserted in the buckle, and a magnetic sensor for generating a different output signal depending whether the magnet is at the first position or the second position, the improvement wherein the holder has a melting point lower than the magnet and the magnet is molded or cast in situ in the holder.

* * * * *